J. C. BAKER.
Wheel.
No. { 1,738, 32,742. }
2 Sheets—Sheet 1.
Patented July 9, 1861.
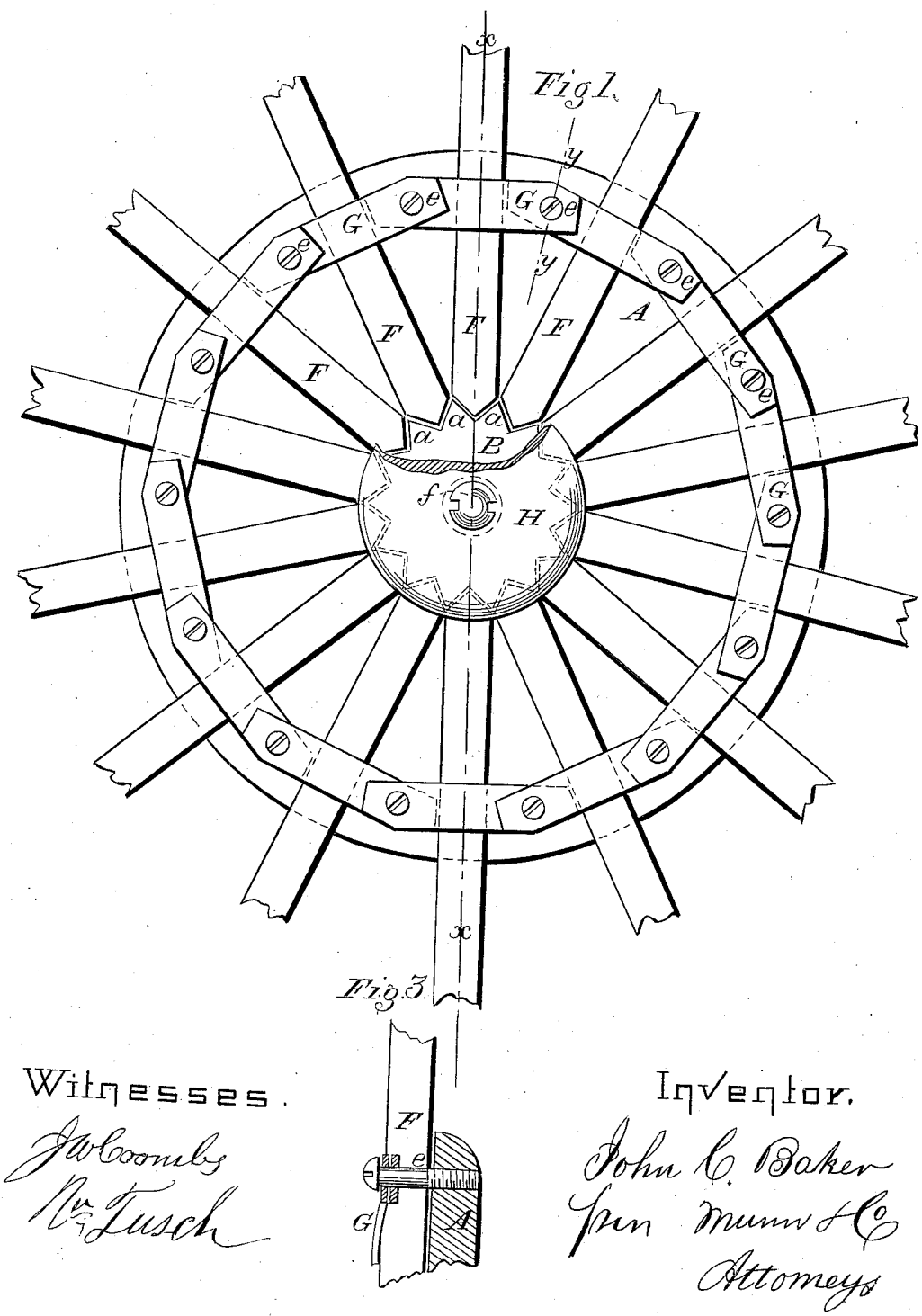
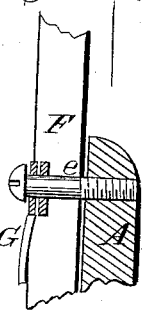

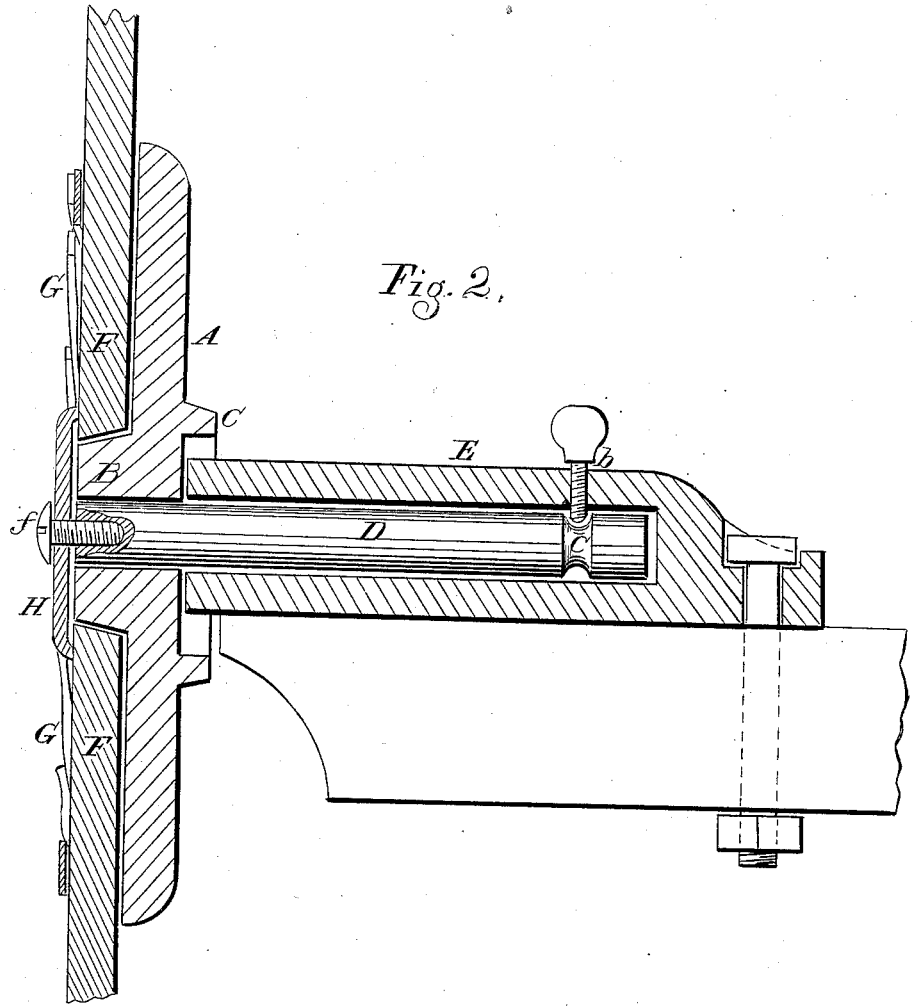

UNITED STATES PATENT OFFICE.

JOHN C. BAKER, OF ADAMS CENTER, NEW YORK.

WHEEL FOR CARRIAGES.

Specification of Letters Patent No. 32,742, dated July 9, 1861.

*To all whom it may concern:*

Be it known that I, JOHN C. BAKER, of Adams Center, in the county of Jefferson and State of New York, have invented a new and useful Improvement in the Construction of Wheels for Vehicles; and I do hereby declare that the following is a full, clear, and exact description of the same, reference being had to the annexed drawings, making a part of this specification, in which—

Figure 1, is a front or face view of the main portion of a wheel constructed according to my invention; Fig. 2, a section of the same, taken in the line $x$, $x$, Fig. 1; Fig. 3, a section of the same, taken in the line $y$, $y$, Fig. 1.

Similar letters of reference indicate corresponding parts in the several figures.

The object of this invention is to construct a wheel in such a manner that any one of its spokes may be removed and a new one inserted in its place without taking the tire from the wheel or disturbing the fellies, the invention at the same time admitting of the wheel being constructed economically and in a very durable manner.

To enable those skilled in the art to fully understand and construct my invention, I will proceed to describe it.

A, represents a circular metal plate at the outer or face side of which there is a concentric circular projection B, having an inclined or beveled periphery, as shown clearly in Fig. 2, and formed with V-shaped projections $a$ all around it as shown in Fig. 1. At the back of the plate A, there is a concentric annular projection C, as shown in Fig. 2, and the plate A, has a wrought metal arm or axle D, firmly secured in it and projecting out a suitable distance from the inner side of the plate, as shown in Fig. 2. The arm or axle D, is fitted in a metal box E, and is secured therein by a screw $b$, which passes through the upper part of the box E, and has its lower end fitted in a groove $c$, made circumferentially in the arm or axle, see Fig. 2. The box E, is secured to the long or main axle by means of a bolt $d$, and suitable clips of the usual form.

F, represents the spokes which are of wood, their inner ends bearing on the periphery of the projection B. The inner ends of the spokes are each notched in V-form so as to fit between the V-shaped projections $a$, and the lower ends of the spokes when thus adjusted are in contact with each other and form a snug fit all around the projection as shown in Fig. 1.

G, represents an annular chain of metal plates which are placed against the face of the spokes F, near the periphery of the plate A, and secured thereto by screws $e$, each screw passing through the adjoining ends of two plates as shown clearly in Fig. 3, and at points equi-distant between the spokes. The plates G, firmly secure the spokes in proper position, preventing any lateral or side movement of the same and the lower ends of the spokes are forced firmly on the projection $a$, by a circular metal plate H, which is secured to the projection B, by a screw $f$ as shown in Fig. 2. By this arrangement the wheel may be very expeditiously and economically constructed and in case a spoke should be broken it can be readily detached by simply removing the circular plate H, and the plate G, which is adjusted to it, a new spoke may then be inserted and neither the felly nor the tire require to be disturbed.

The arm D, may be lubricated at any time by pouring oil into the box E, through an aperture made in it at any suitable point.

Having thus described my invention what I claim as new and desire to secure by Letters Patent, is,

The plate A, provided with the concentric circular projection B, beveled and corrugated at its periphery or provided with pointed projections $a$, in connection with the annular chain of plates G, the circular plate H, and the spokes F, all arranged as and for the purpose set forth.

J. C. BAKER.

Witnesses:
PAUL C. MAXON,
HERMAN MORGAN.